United States Patent
Bossard

[11] Patent Number: 6,113,071
[45] Date of Patent: Sep. 5, 2000

[54] HIGH TEMPERATURE GAS FLOW RATE RESTRICTOR DEVICE

[76] Inventor: Peter R. Bossard, 33 Oswin Turn, Langhorne, Pa. 19047

[21] Appl. No.: 09/216,772

[22] Filed: Dec. 21, 1998

[51] Int. Cl.[7] .................................................. F16K 31/00
[52] U.S. Cl. ........................... 251/346; 251/341; 251/351
[58] Field of Search .................................... 251/341, 346, 251/351

[56] References Cited

U.S. PATENT DOCUMENTS

| | | | |
|---|---|---|---|
| 2,791,236 | 5/1957 | Mauer | 137/608 |
| 3,318,330 | 6/1964 | Dobbs | 137/614.2 |
| 3,601,358 | 8/1971 | Cruse | 255/144 |
| 3,727,638 | 4/1973 | Zaremba, Jr. et al. | 137/572 |
| 4,177,949 | 12/1979 | Curtis et al. | 239/582 |
| 5,957,147 | 9/1999 | Hubbell, Jr. | 137/15 |

*Primary Examiner*—Kevin Shaver
*Assistant Examiner*—David A. Bonderer
*Attorney, Agent, or Firm*—LaMorte & Associates

[57] ABSTRACT

A gas flow restriction device for restricting the flow rate of heated gas in a conduit. The flow restriction device is essentially a two piece assembly that includes a valve housing and a valve gate structure that sits within the housing. The valve housing has a first end, a second end and an open central passage extending from the first end to the second end. The open central passage includes a internally tapered section proximate its first end and an internally threaded section proximate its second end. The valve gate structure has a first end a second end, a externally tapered section proximate its first end and an externally threaded section proximate its second end. The valve gate structure passes into the open central passage of the valve housing so that the externally tapered section of the valve gate structure is disposed a predetermined distance within the internally tapered section of the valve housing. At this location, the externally threaded section of the valve gate structure engages the internally threaded section of the valve housing. By rotating the valve gate structure, the threaded interconnection is effected and the valve gate structure moves in relation to the valve housing.

17 Claims, 3 Drawing Sheets

HIGH TEMPERATURE GAS FLOW RATE RESTRICTOR DEVICE

REFERENCE TO DOCUMENT DISCLOSURE

The matter of this application corresponds to the matter contained in Disclosure Document 436,971 filed Jun. 03, 1998, wherein this application assumes the priority date of that document.

BACKGROUND OF THE INVENTION

1. Field of the Invention

The present invention relates to valve restrictor devices that are intended to control the flow rate of gases flowing through a conduit at elevated temperatures and pressures. More particularly, the present invention is related to valve restriction devices used to regulate the flow of low molecular weight gases, such as hydrogen, that are super saturated with water vapor.

2. Description of the Prior Art

The prior art record is replete with different types of flow restrictor mechanism that can be used to control the flow rate of gas in a conduit. Many such prior art flow restrictors rely upon elastomeric materials within the structure of the restrictor to create gas impervious seals. However, in industry there are many applications where different gases are used at elevated temperatures and pressures. In such applications, flow restrictors with elastomeric seals either melt or vaporize, thereby causing the flow restrictor to fail.

The control of high temperature gas at elevated pressures is even more problematic when the gas being controlled has a low molecular weight, such as hydrogen gas. With a low molecular weight gas, even the smallest of leaks in a seal can result in significant flow rate changes. If the gas being regulated is super saturated with water vapor, flow restrictors with very small flow apertures can easily become clogged. This too creates significant flow rate changes. Many prior art flow restrictors therefore cannot be used because they are incapable of creating a seal that can withstand gases at high temperatures and pressures without failing or clogging.

One specific process that uses low molecular weight gas at high temperature and pressure is the process of purifying hydrogen gas. There are many different ways to produce hydrogen. However, in many common processes that produce hydrogen, the hydrogen gas produced is not pure. Rather, when hydrogen is produced, the resultant gas is often saturated with water vapor and contaminated with hydrocarbons and other contaminants. In many instances, however, it is desired to have ultra pure hydrogen. In the art, ultra pure hydrogen is commonly considered to be hydrogen having purity levels of at least 99.999%. In order to achieve such purity levels, hydrogen gas must be actively separated from its contaminants.

In the prior art, one of the most common ways to purify contaminated hydrogen gas is to pass the gas through a separation conduit made of a hydrogen permeable material, such as palladium or a palladium alloy. As the contaminated hydrogen gas passed through the separation conduit, atomic hydrogen would permeate through the walls of the conduit, thereby separating from the contaminants. In such prior art processes, the separation conduit is kept internally pressurized and is typically heated to several hundred degrees centigrade. Within the separation conduit, molecular hydrogen disassociates into atomic hydrogen on the surface of the separation conduit and the separation conduit absorbs the atomic hydrogen. The atomic hydrogen permeates through the separation conduit from a high pressure side of the conduit to a low pressure side of the conduit. Once at the low pressure side of the separation conduit, the atomic hydrogen recombines to form molecular hydrogen. The molecular hydrogen that passes through the walls of the separation conduit can then be collected for use. Such prior art systems are exemplified by U.S. Pat. No. 5,614,001 to Kosaka et al., entitled Hydrogen Separator, Hydrogen Separating Apparatus And Method For Manufacturing Hydrogen Separator.

In order to keep gas within the separation conduit at an elevated pressure, a restriction is placed at the venting end of the conduit. The restriction allows only a small volume of hydrogen from exiting the separator conduit in a given period of time, thereby causing the hydrogen in the separator conduit to remain at an elevated pressure.

Since the gas being restricted is mostly hydrogen, relatively small openings in the restriction create significant flow rates. In certain prior art separators, the restriction currently being used is a metal plate obstruction having 0.0008 inch pin aperture formed through the center of the obstruction. An aperture of that size is rated to create a flow rate of approximately 140 cubic centimeters per minute of helium at 400 degrees celsius and 140 p.s.i. However, when such an aperture is used in a hydrogen separator, the small aperture tends to become clogged by condensing water vapor and other contaminants that are present in the hydrogen gas. Additionally, such prior art flow restrictors are not adjustable. Consequently, if it is desired to change the flow rate, the flow restrictor must be replaced.

A need therefore exists in the art for a flow rate restrictor that can restrict the flow of gases having low molecular weights and flowing at elevated temperatures and pressures. A need also exists for a gas flow restrictor that can restrict low molecular gas containing contaminants without clogging.

SUMMARY OF THE INVENTION

The present invention is a gas flow restriction device for restricting the flow rate of heated gas in a conduit. The flow restriction device is essentially a two piece assembly that includes a valve housing and a valve gate structure that sits within the housing. The valve housing has a first end, a second end and an open central passage extending from the first end to the second end. The open central passage includes a internally tapered section proximate its first end and an internally threaded section proximate its second end.

The valve gate structure has a first end a second end, a externally tapered section proximate its first end and an externally threaded section proximate its second end. The valve gate structure passes into the open central passage of the valve housing so that the externally tapered section of the valve gate structure is disposed a predetermined distance within the internally tapered section of the valve housing. At this location, the externally threaded section of the valve gate structure engages the internally threaded section of the valve housing. By rotating the valve gate structure, the threaded interconnection is effected and the valve gate structure moves in relation to the valve housing.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE INVENTION

Although the present invention flow restriction device can be used to restrict the flow of most any gaseous or liquid fluid, the present invention flow restriction device is particularly well suited for use in restricting low molecular weight gas at elevated temperatures and pressures. Accordingly, by way of example, the present invention restriction device will be described in an application where the restriction device is being used to restrict contaminated hydrogen gas flowing through a conduit at approximately 400 degrees Celsius so as to create a back pressure in that conduit of approximately 150 pound per square inch. However, the flow restrictor that will be described is capable of controlling the flow of gas in a conduit up to the pressure and temperature limitations of the conduit being used.

Figure 1:
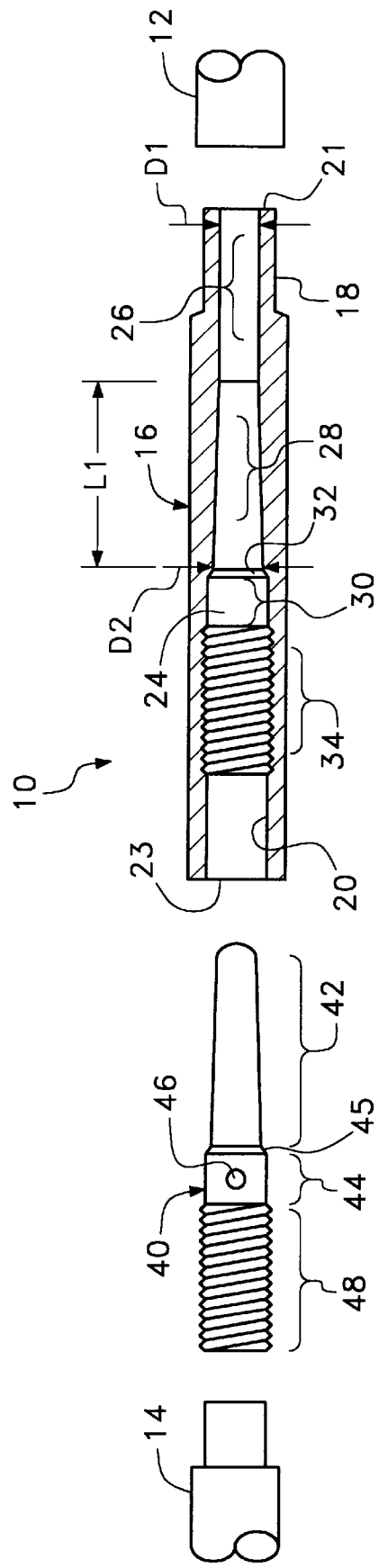
FIG. 1 is an exploded view of one preferred embodiment of the present invention assembly, wherein a valve housing is shown in cross-section and a valve gate structure is shown with a side elevated view.

Referring to FIG. 1, there is shown an exploded view of an exemplary embodiment of the present invention flow restriction device 10. The flow restriction device 10 is coupled to a supply conduit 12 and a drain conduit 14. The supply conduit 12 is coupled to a source of heated gas. The drain conduit 14 leads to an ambient pressure venting port. The purpose of the flow restriction device 10 is to restrict the flow of gas from the supply conduit 12 to both the drain conduit 14 so as to elevate the pressure of the gas within the supply conduit 12.

In the shown embodiment, both the supply conduit 12 and the drain conduit 14 attach to the valve housing 16 of the flow restriction device 10. The shown valve housing 16 has a reduced neck 18 that passes into the supply conduit 12, wherein the reduced neck 18 can be brazed or welded in place. Similarly, the valve housing 16 of the flow restriction device 10 also includes a reduced receptacle 20 at its rearward end that is sized to receive the drain conduit 14. The drain conduit 14 can be similarly brazed or welded into place. The shown configuration for attaching the flow restriction device 10 to the supply conduit 12 and the drain conduit 14 is merely exemplary. In the prior art there are many different fittings and techniques that are used to interconnect conduits. Many of those prior art coupling configurations and techniques can be adapted for use by the present invention. One such alternate embodiment is a simple flush abutment between the flow restriction device and the two conduits, wherein the line of abutment is welded.

The valve housing 16 of the flow restriction device 10 is tubular in its construction, thereby providing an uninterrupted central passage 24 from its forward end 21 to its rearward end 23. Starting at the forward end 21 of the valve housing 16, it can be seen that the first region of the central passage 24 is a straight cylindrical section 26 having generally the same internal diameter D1 as does the supply conduit 12. The straight cylindrical section 26 of the central passage 24 leads into an internally tapered section 28. The internally tapered section 28 tapers from the internal diameter D1 of the straight cylindrical section 26 to a larger internal diameter D2 across a predetermined length L1. The predetermined length L1 is preferably between two times and twenty times the size of the larger internal diameter D2.

At the rear end of the internally tapered section 28 of the central passage 24, the internally tapered section 28 intersects a pressure exchange section 30. The pressure exchange section 30 has an internal diameter larger than that of the large end of the internally tapered section 28. Accordingly, a ridge 32 exists at the interface between the pressure exchange section 30 and the internally tapered section 28 of the open passage 24. The ridge 32 between these sections is preferably beveled for a purpose which will later be explained.

The pressure exchange section 30 of the open passage 24 within the valve housing 16 leads to a straight internally threaded section 34. The internally threaded section 34 has a predetermined length, a predetermined thread diameter and a predetermined thread pitch.

Lastly, the internally threaded section 34 of the open passage 24 within the valve housing 16 intersects the reduced receptacle 20 that receives the drain conduit 14.

Also in FIG. 1, the external structure of the valve gate structure 40 of the flow restriction device 10 is shown. The valve gate structure 40 is sized to fit within the open passage 24 of the valve housing 16. The valve gate structure 40 enters the valve housing 16 from its rearward side 23. The valve gate structure 40 has an externally tapered section 42 at its forward end. The rise and run of the taper on the exterior of the tapered section of the valve gate structure 40 is generally equivalent to the rise and the run of the internally tapered section 28 of the valve housing 16. The length of the externally tapered section 42 of the valve gate structure 40 is preferably between two time and twenty times the size of its maximum diameter.

The mid-section 44 of the valve gate structure 40 has a predetermined diameter, which is larger than the maximum diameter of the externally tapered section 42. The mid-section 44 of the valve gate structure 40 is sized to fit within the pressure exchange section 30 of the valve housing 16. The mid-section 44 of the valve gate structure 40 is beveled near the externally tapered section 42, thereby creating a beveled surface 45 that assists in a smooth transition from the externally tapered section 42 of the valve gate structure 40 to the mid-section 44 of the valve gate structure 40. A lateral hole 46 is formed through the mid-section 44 of the valve gate structure 40 across its diameter. The purpose of the lateral hole 46 will later be described.

An externally threaded section 48 of the valve gate structure 40 extends from the rearward end of the valve gate structure 40 to the mid-section 44 of the valve gate structure 40. The externally threaded section 48 of the valve gate structure 40 has generally the same thread diameter and thread pitch as does the internally threaded section 34 of the valve housing 16.

Figure 2:
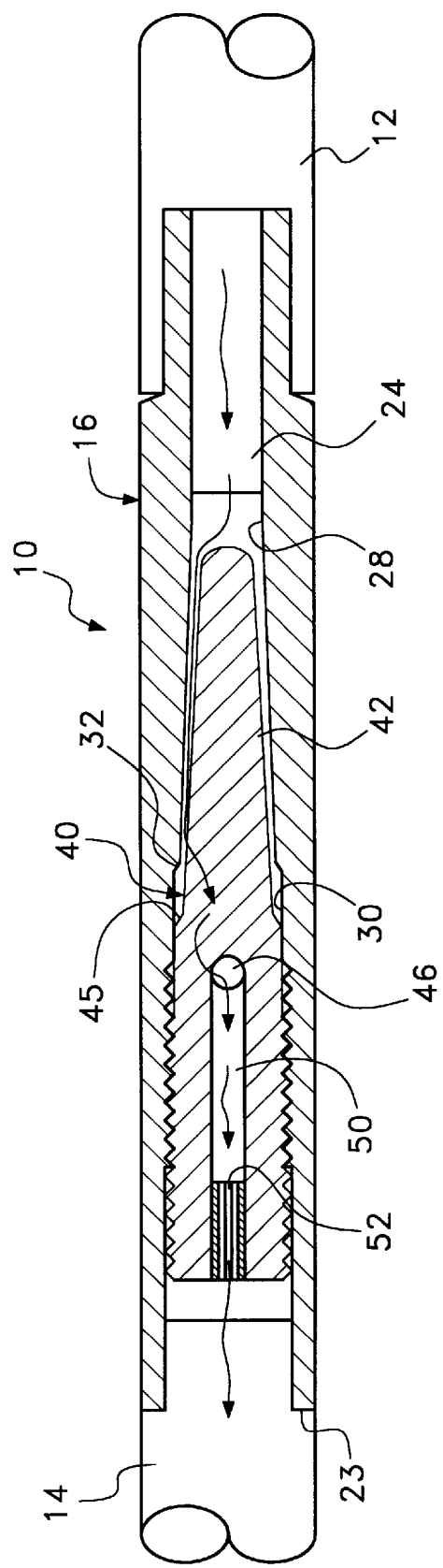
FIG. 2 is an assembled cross-sectional view of the embodiment of FIG. 1.

Referring to FIG. 2, the internal structure of the valve gate structure 40 is shown. In the valve gate structure 40 a longitudinal bore 50 is present. The longitudinal bore 50 extends from the rearward end of the valve gate structure 40, through the center of the externally threaded section 48 (FIG. 1) and into the mid-section 44 (FIG. 1) of the valve gate structure 40. The longitudinal bore 50 intersects the lateral hole 46 in the mid-section 44 (FIG. 1) of the valve gate structure 40.

An insert 52 is disposed in the longitudinal bore 50 proximate the rearward edge of the valve gate structure 40. The insert 52 is tubular and contains a hex nut shaped internal configuration for a purpose which will be later explained.

In FIG. 2, it can be seen that the valve gate structure 40 is inserted into the valve housing 16 through the rearward end 23 of the valve housing 16. As the valve gate structure 40 is inserted into the valve housing 16, the externally tapered section 42 of the valve gate structure 40 passes into the internally tapered section 28 of the valve housing 16. Similarly, the mid-section 44 (FIG. 1) of the valve gate structure 40 passes into the pressure exchange section 30 of the valve housing 16 and the externally threaded section 48 (FIG. 1) of the valve gate structure 40 engages the internally threaded section 34 (FIG. 1) of the valve housing 16. As the externally threaded section 48 (FIG. 1) of the valve gate structure 40 is advanced into the valve housing 16, the externally tapered section 42 of the valve gate structure 40 is advanced into the internally tapered section 28 of the valve housing 16. As such, the degree by which the internally tapered section 28 of the valve housing 16 is obstructed is increased. The length of the externally threaded section 48 (FIG. 1) of the valve gate structure 40 and the degree of taper in the externally tapered section 42 are calculated so that when the beveled edge 45 of the mid-section of the valve gate structure 40 abuts against the beveled edge 32 in the valve housing 16, the externally tapered section 42 of the valve gate structure 40 is in abutment with the internally tapered section 28 of the valve housing 16. At this point, the internally tapered section 28 of the valve housing 16 in nearly completely obstructed and the flow of gas through the entire flow restriction device 10 is at its minimum, which can be zero.

As the valve gate structure 40 is slowly retracted out of valve housing 16, the degree of obstruction in the interior tapered section 28 of the valve housing 16 decreases. The increase or decrease in the degree of obstruction caused by the rotation of the valve gate structure 40 is dependent upon the slope of the tapered surfaces and the pitch of the threads in the threaded sections. Consequently, the change in the degree of obstruction crated by the rotation of the valve gate structure 40 in the valve housing 16 can be varied into many different ratios.

From FIG. 2, it can be seen that gas flowing through the supply conduit 12 flows into the central passage 24 of the valve housing 16. As the gas enters the internally tapered section 28 of the valve housing 16, the flow of gas is partially obstructed by the presence of the externally tapered section 42 of the valve gate structure 40. The degree by which the flow of gas is obstructed depends upon how deeply the valve gate structure 40 is advanced into the valve housing 16. The obstruction caused by the presence of the valve gate structure 40 causes a back up of gas in the supply conduit 12, thereby elevating the pressure of the gas in the supply conduit 12.

As gas flows between the internally tapered section 28 of the valve housing 16 and the externally tapered section 42 of the valve gate structure 40, the gas enters the gas exchange section 30 (FIG. 1) in the center of the open passage 24. At this point, the gas is free to flow into the lateral hole 46 disposed in the mid-section of the valve gate structure 40. As the gas flows into the lateral hole 46, the gas enters the longitudinal bore 50 that extends to the rearward end 23 of the valve gate structure 40. The gas flows through the longitudinal bore 50 and enters the drain conduit 14, which is at ambient pressure.

The gas flow across the entire surface of the externally tapered section 42 of the valve gate structure 40. According, should the gas contain any contaminants, the contaminants would not significantly effect the flow of gas, should the contaminants lodge between the valve gate structure 40 and the valve housing 16. Furthermore, the build up of contaminants can readily be cleaned by removing the valve gate structure 40 from the valve housing 16 an a periodic maintenance.

Figure 3:
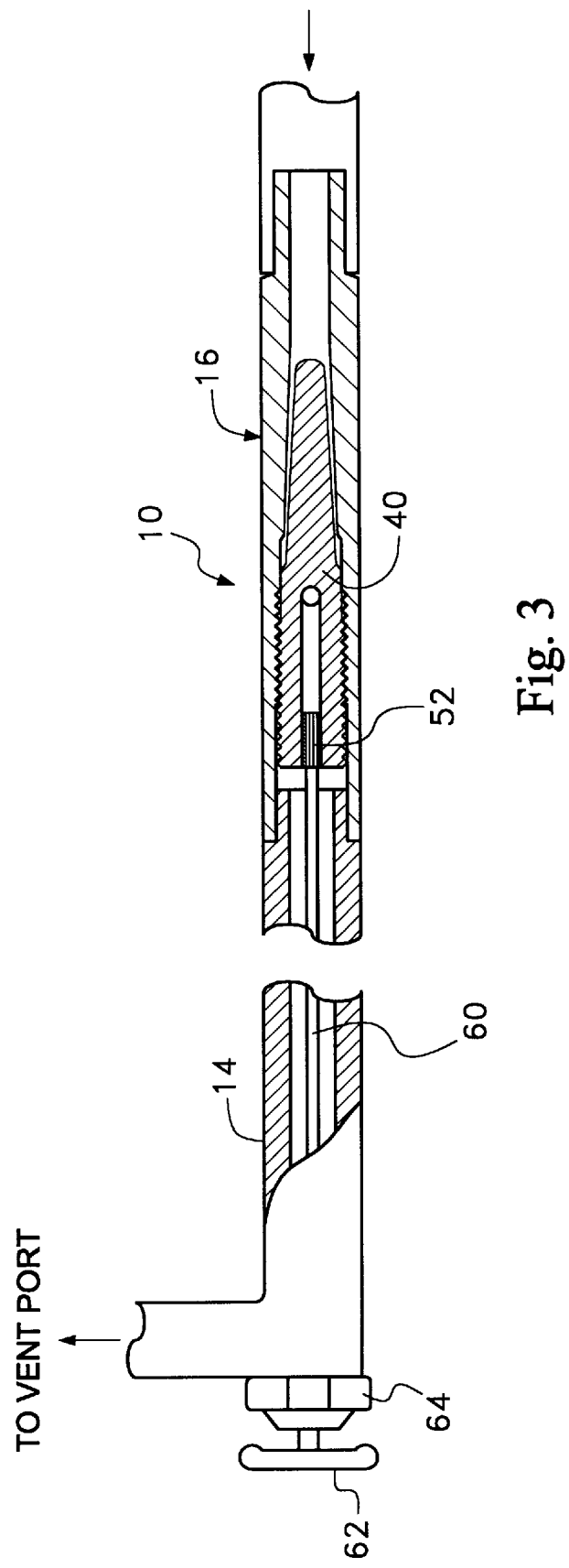
FIG. 3 is an cross-sectional view of the embodiment of FIG. 1 shown with a manual adjustment assembly.

Referring to FIG. 3, it can be seen that the flow restriction device 10 is selectively regulated by rotating the valve gate structure 40 within the valve housing 16. In the shown embodiment, this is done by an elongated allen key 60 that engages the insert 52 at the rearward end of the valve gate structure 40. By engaging the allen key 60 within the insert 52, the rotation of the allen key 60 will effect a rotation on the valve gate structure 40.

In the shown embodiment, the allen key 60 engages an insert. This embodiment is merely exemplary and it should be understood that other configurations can be used. For example, a square flat head or Phillips head depression can be formed in the rearward end of the valve stem. Such a depression would eliminate the need for an hexagonal insert, yet would serve the same function.

In FIG. 3, an configuration is shown for providing an manually adjustable flow restriction device 10 in a high temperature application. In the shown application, the flow restriction device 10 is being used to regulate the flow of a gas at a temperature that would rapidly burn the skin. Accordingly, a direct manual adjustment at the point of the flow restriction device 10 would be impractical. Rather, an allen key 60 is supported in the center of the drain conduit 14. The length of the allen key 60 is long enough to provide a safe temperature at the end of the allen key 60. The allen key 60 terminates with a handle 62. The allen key 60 passes through a valve seal 64 that prevents gas from exiting the drain conduit 14 at the handle 62. Rather the drain conduit 14 is directed to an ambient vent port at a remote location from the manual adjustment handle 62.

In the shown embodiment, the drain conduit 14 extends in a straight line between the manual adjustment handle 62 and the flow restriction device 10. However, by the use of flexible torque transmitting extensions, universal joints and other extension devices, the drain conduit need not be straight. Rather, the drain conduit can be convoluted and a torque transferring device can still be present within the drain conduit. Furthermore, it should be understood that a manual adjustment need not be used in the practice of the present invention. Rather, the manual handle can be replaced with hydraulic, pneumatic, or electrical servos that can adjust the flow restriction device in an automated fashion.

It will be understood that the various figures described above illustrate only exemplary embodiments of the present invention. A person skilled in the art can therefore make numerous alterations and modifications to the shown embodiments utilizing functionally equivalent components to those shown and described. All such modifications are intended to be included within the scope of the present invention as defined by the appended claims.

What is claimed is:

1. An gas flow restriction device, comprising:

a valve housing having an open first end, an open second end and an open central passage extending from said first end to said second end, said open central passage including an internally tapered section proximate said first end and an internally threaded section proximate said second end, wherein said internally tapered section tapers from a first diameter to a smaller second diameter with a first rate of slope and said internally tapered section has a length that is least twice as long as said first diameter;

a valve gate structure having a first end, a second end, an externally tapered section proximate said first end and an externally threaded section proximate said second end, said externally tapered section having a second rate of slope that matches said first rate of slope, wherein said valve gate structure passes into said open central passage of said valve housing so that said externally tapered section of said valve gate structure is disposed a predetermined distance within said internally tapered section of said valve housing and said externally threaded section of said valve gate structure engages said internally threaded section of said valve housing.

2. The device according to claim 1, wherein said predetermined distance can be selectively varied by rotating said valve gate structure relative said valve housing.

3. The device according to claim 1, wherein said valve gate structure includes a mid-section disposed between said externally tapered section and said internally tapered section and said valve gate structure further contains a conduit that travels through said valve gate structure from a point on the exterior of said mid-section to said second end of said valve gate structure.

4. The device according to claim 1, wherein said valve gate structure is positional within said valve housing between an open position and a closed position, wherein said valve gate structure is fully advanced in said valve housing when said valve gate structure is in said closed position.

5. The device according to claim 4, wherein said externally tapered section of said valve gate structure abuts against said internally tapered section of said valve housing when said valve gate structure is at said closed position.

6. The device according to claim 1, wherein said valve gate structure has a means for engaging an allen key disposed at its second end.

7. The device according to claim 1, wherein said externally tapered section tapers from a large diameter to a small diameter and said externally tapered section has a length that is at least twice as long as said large diameter.

8. The device according to claim 1, wherein said internally tapered section has a length that is between ten times and twenty times said first diameter.

9. A variable gas flow restriction device, comprising:

a valve housing having a central passage extending therethrough, said central passage containing an internally tapered section;

a metal valve gate structure sized to fit within said central passage, said valve gate structure containing an externally tapered section capable of obstructing said central passage in said internally tapered section of said valve housing when said valve gate is disposed at a fully advanced position within said central passage, wherein said externally tapered section tapers from a first diameter to a smaller second diameter with a first rate of slope and said externally tapered section has a length that is least twice as long as said first diameter; and a mechanism selectively varying the position of said valve gate structure within said valve housing between a retracted position and said fully advanced position.

10. The device according to claim 9, wherein said mechanism includes a threaded engagement between said valve gate structure and said valve housing.

11. The device according to claim 10, wherein said mechanism includes a handle and an extended element that interconnects said handle to said valve gate structure.

12. The device according to claim 10, wherein said valve gate structure includes a mid-section and said valve gate structure further contains a conduit that travels through said valve gate structure from a point on the exterior of said mid-section to a rearward end of said valve gate structure.

13. The device according to claim 10, wherein said valve housing and said valve gate structure are both unistructurally fabricated from a common metal.

14. The device according to claim 9, wherein said externally threaded section of said valve gate structure has a predetermined length and a predetermined diameter, wherein said predetermined length is at least twice as long as said predetermined diameter.

15. The device according to claim 9, wherein said internally tapered section of said valve housing has a rate of slope equivalent to said first rate of slope.

16. The device according to claim 10, wherein said valve gate structure is a unistructurally fabricated from a solid piece of metal.

17. The device according to claim 9, wherein said internally tapered section tapers from a large diameter to a small diameter and said internally tapered section has a length that is at least twice as long as said large diameter.

* * * * *